(12) United States Patent
Vieri et al.

(10) Patent No.: US 7,310,329 B2
(45) Date of Patent: Dec. 18, 2007

(54) SYSTEM FOR SENDING TEXT MESSAGES CONVERTED INTO SPEECH THROUGH AN INTERNET CONNECTION TO A TELEPHONE AND METHOD FOR RUNNING IT

(76) Inventors: Riccardo Vieri, Via Montelupo 117, Montespertoli (IT) I-50025; Cristiano Tomasso, Via di G. dei Marignolli 82, Florence (IT) I-50127; Flavio Vieri, Via Montelupo 117, Montespertoli (IT) I-50025

( * ) Notice: Subject to any disclaimer, the term of this patent is extended or adjusted under 35 U.S.C. 154(b) by 703 days.

(21) Appl. No.: 10/491,797

(22) PCT Filed: Oct. 21, 2002

(86) PCT No.: PCT/IT02/00673

§ 371 (c)(1),
(2), (4) Date: Apr. 6, 2004

(87) PCT Pub. No.: WO03/041364

PCT Pub. Date: May 15, 2003

(65) Prior Publication Data

US 2005/0117564 A1    Jun. 2, 2005

(30) Foreign Application Priority Data

Oct. 22, 2001   (IT) ............................. FI2001A0199

(51) Int. Cl.
*H04L 12/66*    (2006.01)
*H04M 1/64*    (2006.01)
*H04M 11/00*    (2006.01)

(52) U.S. Cl. .................. 370/352; 455/414.4; 455/466; 379/88.14; 379/88.17; 379/100.09

(58) Field of Classification Search ........ 370/352–360; 379/52, 67.1, 88.16, 88.17, 88.14, 100.09; 455/417, 425, 456.6, 414.4, 466
See application file for complete search history.

(56) References Cited

U.S. PATENT DOCUMENTS

| | | | | |
|---|---|---|---|---|
| 5,950,123 | A | * | 9/1999 | Schwelb et al. ......... 455/414.4 |
| 6,389,114 | B1 | * | 5/2002 | Dowens et al. ............... 379/52 |
| 6,421,707 | B1 | * | 7/2002 | Miller et al. ................. 709/206 |

(Continued)

FOREIGN PATENT DOCUMENTS

EP    0946032 A    9/1999

(Continued)

OTHER PUBLICATIONS

Rossfrank, "Konstenlose Sprachmitteilungins Festnetz", Dec. 10, 2000, pp. 1-4, XP002234425, Germany.

*Primary Examiner*—Binh K. Tieu
(74) *Attorney, Agent, or Firm*—David A. Guerra

(57) ABSTRACT

This invention consists of a system permitting to send text messages by Internet and let them arrive in the form of speech directly on the addressee's phone. This system works by means of a central server, where at least one software is installed, which receives the written message, converts it into speech and processes it, so that it can be sent in vocal form on a telephone line. The user receiving the message can also answer it, sending another message to the sender, always using the telephone.

16 Claims, 5 Drawing Sheets

U.S. PATENT DOCUMENTS

| | | | |
|---|---|---|---|
| 6,456,616 B1 * | 9/2002 | Rantanen | 370/352 |
| 6,529,592 B1 * | 3/2003 | Khan | 379/114.01 |
| 6,816,578 B1 * | 11/2004 | Kredo et al. | 379/88.17 |
| 6,907,112 B1 * | 6/2005 | Guedalia et al. | 379/88.17 |
| 7,065,185 B1 * | 6/2006 | Koch | 379/88.14 |
| 7,113,803 B2 * | 9/2006 | Dehlin | 455/466 |
| 2004/0208302 A1 * | 10/2004 | Urban et al. | 379/142.17 |

FOREIGN PATENT DOCUMENTS

| | | |
|---|---|---|
| JP | 2000134407 A | 5/2000 |
| WO | WO 0019697 A | 4/2000 |

* cited by examiner

FIG. 4A

Select the addressee the help call is directed to. Leave your telephone number in order to receive possible communications.

Addressee No. | police 113

Sender No. | 064554

WRITE YOUR MESSAGE and make it heard on any telephone in the world!

I'm a dumb boy. I'm alone at home and I'm afraid that burglars are inside. Help me, I'm at 15, via Rossi in Florence.

Enter

FIG. 4B

Enter the telephone number you want to send the message to. Leave also your telephone number in order to receive possible communications Addressee No. | 05514234

Sender No. | 3351411

WRITE YOUR MESSAGE and make it heard on any telephone in the world!

Hi, I'm ROSSI Marco, I read your ad and I'm interested in the job you offer. I would like to work with you. The e-mail address found on the web is wrong and I'm abroad at the moment. Could you please contact me at the number 351411.

Enter

FIG. 4C

| | | |
|---|---|---|
| Enter the nickname of the person you want to send the message to. Leave your nickname in order to receive possible communications. Write the language you want the message should be heard in. | | WRITE YOUR MESSAGE and make it heard on any telephone in the world! |
| Addressee No. | Misscuba | Hi, I'm an Italian boy and I live in Florence. Would you like to visit me next summer? My nickname is italia12. |
| Sender No. | Italia12 | |
| Language | English | Enter |

FIG. 4D

| | | |
|---|---|---|
| Enter the telephone number you want to send the message to. Leave also your telephone number in order to receive possible communications. | | WRITE YOUR MESSAGE and make it heard on any telephone in the world! |
| Addressee No. | 065434 | Hello Monica. I know you're at home, I'm late and I've finished the money on my telephone card. I'll come for you at nine. See you later. Adriano. |
| Sender No. | 064554 | |
| | | Enter |

SYSTEM FOR SENDING TEXT MESSAGES CONVERTED INTO SPEECH THROUGH AN INTERNET CONNECTION TO A TELEPHONE AND METHOD FOR RUNNING IT

TECHNICAL FIELD

This invention relates to the technical sector of electronics and particularly the one concerning the design of communication systems. The object of the present invention is a system permitting to send and/or receive text messages from the web and convert them into speech, reaching a telephone number, to save all the communication data on a database and, under authorization, to control, select, check, confirm and/or identify the criteria of transmission operating directly from the web.

BACKGROUND ART

The prior art comprises different systems using Internet like a mean of transferring data, but it doesn't comprise systems capable of sending text messages from Internet and convert them into vocal messages on a telephone line.

By means of an IP connection it's possible to download songs, to telephone, to send e-mail messages, and to send SMS messages.

The most common peripheral unit, available for everyone, to be connected to Internet is the modem. This word is a mixture of two words, modulator and demodulator. The function of a modem is to convert digital data in the form of electric pulses into a form that can be used for the transmission on the normal telephone lines.

Therefore, the modem converts electric signals coming from the computer into sounds and permits their transmission by means of the telephone line. The receiving modem makes the opposite operation: as soon as it receives the sounds from the telephone line, it reconverts them into electric signals in order to make them available to the computer it is connected to. This further operation is called demodulation. Technical evolutions of modems are the new peripheral units and digital platforms that send data on a suitably shaped line without any need to convert them into sounds. We're talking about ISDN data transmitting cards. Another resource available to users is the DSL connection. Using this system it's possible to divide the vocal transmission from the data one, thanks to particular filters.

Also referring to Internet connections, the last available technology for users is the system of connection by satellites. Thanks to these systems nowadays even people who are not experts of hardware and software can surf on Internet, send e-mail messages, send SMS messages, send and receive fax and other relative operations. By means of data transmitting cards, permitting the transmission of complex data in audio and even video forms, also called technological platforms, many companies develop more and more complex programs and applications in order to provide firms with ancillary services.

One of the easiest ways to send communications with a telephone, using Internet, is writing SMS messages. For this purpose, the user fills in a form on the web writing a text and sends it to a server/gateway that transfers it to the mobile number the message is directed to.

However, this means of communication has some drawbacks. At first, SMS messages must be short and the communication reaches almost exclusively the users of the country where the portal works, in addition these SMS messages neither reach cordless phones not using the GSM system, nor common house telephones. What's more important is that the communication that reaches the final destination is mainly textual, in the form of a message that can be read on a display, not vocal. Another important characteristic is that users cannot verify immediately the result of the SMS message sent on-line.

On the contrary, the "text-to-speech" technology exists, which permits some interactions via internet/telephone. By these means, at present, an internet/telephone service where the TTS is in use, is the one allowing a service subscriber to receive the notification that a message has arrived on the phone, or to dial a telephone number and listen to the message in the form of speech. Nevertheless, this system is not convenient, as it needs registrations, it is limited and not easy to be used by an inexpert user. The TTS technology principally reads texts and makes them speeches, or vice versa, but it's extensive and however it doesn't allow to write and send a vocal message on a phone. As a matter of fact, the TTS technology has been useful for teaching, utility and support purposes, in particular for those disabled and blind, but as regards to its use with the telephone interactions, it's mostly based on "inbound" applications, i.e. centred in order to support inbound and not outbound communications. The vocal tree menus are an example of this and are used by companies in order to automatically provide the caller with information.

Other systems permitting to communicate by voice with another user by Internet also exist, but with the traditional methods, people holding a single telephone line cannot communicate by voice in a simple and comfortable way through the computer with another telephone. In fact, in order to make a call using Internet you need software, loudspeakers and microphones. In addition, also this one is a voice-to-voice communication, while at the present prior art an Internet user is not able to send text messages to the designated telephones, except for the messages appearing on the display of the phone.

The prior art does not include any system permitting to change a written communication into speech, reaching a normal telephone, by means of an IP connection.

This is the technical problem to be solved and the aim of the present invention.

The possibility to send long and wide text messages, later converted into vocal messages, to telephone numbers all around the world, permits to send easily and rapidly any kind of communication, no matter the length of the text. This operation can reduce costs and gives the sender a better guarantee than the previous systems, permitting a complete confirmation of the receipt by the addressee. Also the e-mails, the most widespread means of communication via web, cannot give guaranties about the correct receipt of the communication by the addressee. As a matter of fact, a simple automatic acknowledge transmission of the e-mail by the addressee to the sender is not sufficient to say he/she has entirely read the communication or understood its meaning. This acknowledge is much more complete using the system object of the present invention, which permits to check the complete or partial receipt of the communication, registering the opinions and interactions of the addressee. The present invention has also other advantages: for example, it allows people who have problems with communication, e.g. autistic, deaf and dumb, to communicate vocally on the phone with anyone without using their own voice, sending messages, help calls and other services by phone, so that the written text arrives to the addressee in the form of speech. Another application of this invention is to translate the text in any language by means of a simultaneous translator that changes the written text into the desired language and sends it to the addressee in the form of speech.

DISCLOSURE OF INVENTION

The system and method object of the present invention allows all Internet surfers, or more generally everyone has a modem and/or even a more developed analogue or digital card transmitting and receiving data, to be able to write a text on a form found on the web site and/or by means of an interface downloaded from a software, to send this message to a telephone number and make it known to the addressee in real time and/or by pre-record. This system also constitutes a valid alternative to communicate vocally with another person with a single telephone line simply by writing a text, with no need of loudspeakers and microphones or subscriptions to services permitting to telephone by Internet.

This invention aims at transmitting on a common telephone vocal messages obtained by the conversion of text messages written by the user and sent by Internet.

This technical problem has not been solved in any way and no systems exist that can write a message on an Internet interface and send it to a server that will convert the text into speech and send it through digital or analogue telephone line to one or more designated receivers.

The system object of the present invention involves more hardware and software devices, telematic instruments and systems for the transmission of data, which together allow the receipt of a vocal message sent originally by the Internet in the form of text. This system would not work if used with a simple software, which means that an Internet user would not reach the aim of this invention using a simple software.

The system for sending text messages converted into speech, object of the present invention, comprises:

- means to write and send messages, by a data input device consisting of a hardware showing a table where users can write a text message and/or order the transmission of a pre-recorded message, indicate the telephone number(s) of the addressee or a database where addressees' telephone numbers can be found, and send it to another hardware working as server;
- means to connect the data input device with a server, consisting of a connection to the Internet by modem, data transmitting and receiving cards, similar apparatus or kits for satellite connection;
- means to receive and process the text message, by a hardware working as server, where a program is installed able to convert the text message into vocal message and set it up for the transmission on the phone, and comprising other applications capable of controlling and filing the data relative to the entire telephone transaction;
- means to transmit the vocal message on the telephone line by a voice modem or other technological peripherals for the transmission of at least vocal data;
- means to receive the message, consisting of a common phone.

Conveniently, it's possible to reply to the vocal messages received by means of a suitable keyboard connected to the phone using DTMF keys and tones.

Conveniently, the addressee can send a reply vocal message to the sender, so that it is then filed on the server.

Conveniently, on the computer through which data are input a software is installed, which permits the transmission of text messages by modem, or otherwise, digital and/or analogue cards for transmitting and receiving pre-recorded communications.

The program installed by the user is represented by an icon on the browser, in case the user is surfing on Internet or is not using it in that particular moment.

Conveniently, on the computer through which data are input, there is a table, either created by an installed software or an html form or similar, which comprises a suitable interface used to write the message and send it to the server carrying out the transaction until the message reaches its destination. By this interface the user can write many messages to various people and send them by means of an automatic connection to Internet.

Said table is also used to send pre-recorded communications loaded on an external server, not on the user's one, to various addressees and at specific hours.

Conveniently, the table through which messages are written includes an area for the optional input of the sender's telephone number or his/her "alias" or nickname.

Conveniently, the table through which messages are written includes an area for the necessary input of the addressee's telephone number or his/her "alias" or nickname.

Conveniently, the table through which messages are written includes an area for the input of the language we want to use to send the message to the designated telephone number.

Conveniently, the table through which messages are written includes an area for the selection of the pre-recorded message we want to send.

The system object of this invention permits the transmission from the web of both text and pre-recorded messages in different forms, thanks to a system for compressing and converting data. Nowadays, the transmission of pre-recorded messages for telemarketing campaigns and the conversion of the text into speech have some technical limits. Particularly recorded messages converted into files, often take such wide dimensions that they are not easy to send to the addressee. In addition, the "voice engines", which are the engines that change the text into speech, cannot be easily used, as they need a computer background on operating systems and the small amount of information available cannot be easily understood by everyone.

Conveniently, the audio messages registered in professional forms, as well as the text files for the conversion in audio form "text-to-speech" technology, are converted into smaller files and sent to the addressee simply using voice modems and not necessarily sophisticated data transmitting cards. As a matter of fact, too big files would not allow the telephone message to be transmitted immediately. The user on the phone should wait some minutes before receiving the communication and could hang up. The bigger is the file to send the longer the wait. The system object of the present invention avoids this drawback thanks to particular technical solutions: first, inserting an initial immediate "beep", starting when the receiver is connected, which allows the addressee to hear a signal and hold it waiting, in case he needs less time to listen to the communication; second, converting the forms into automatically smaller files, thanks to a particular system for the compression of audio files, which makes them in an average mono quality, sufficient enough for the reception level of the phone; the third solution is the possibility to insert at the beginning of the call a "confirmation file", i.e. an acknowledge vocal message, which causes the user interact with the telephone keyboard for listening or declining the arriving communication.

Conveniently, the text communication can be addressed to an "alias" and not to a particular telephone number. The server will be able to identify the alias and connect the communication to a specific telephone number, ensuring the privacy of the users.

This system also allows everyone, under authorization, to use the most applications and functions available, thanks to the database on the web server. An Internet user, with his/her password, will be able to send various communications to various addresses, simply by indicating the required preferences.

Conveniently, the server holds a file archive with database and multiple supports that allows authorised users to import files with telephone numbers, write a text or retrieve pre-recorded messages, record them in different audio form, send them to the addressees and file everything on the server database. All that thanks to a simple connection to Internet, without particular programs or the help of experts in this field.

Conveniently, the users will be able to write simple messages and send them with synthesized voices and possibly real, chosen among figures at pleasure, like robots, actors, singers, football players and other. With a simple photo and a nickname of the addressee, it's possible to send him/her a communication on the phone without knowing his/her number, and also relations between foreign companies might develop thanks to the possibility of a translator that converts the text into the desired language and sends it to the addressee. Anyone has difficulties in speaking will have a new means of communication. People can talk together saving time and money, because operational and telephone costs will be covered by sponsors and advertising. New jobs relative to services, information and public utility will be created, as this system has no transmission limits.

Conveniently, the table through which messages are written includes an area for the insertion of the time and data to send the message.

Conveniently, the table through which messages are written includes an area for the selection of the tone of voice we want to use to send the message.

Conveniently, the table through which messages are written includes an area for the selection of the transmission and/or reception of the messages to several telephone numbers.

Conveniently, the table through which messages are written includes an area for the selection of the automatic repeat of the number, in case the number called is engaged and/or free but without answer, choosing how many calls to try.

Conveniently, the table through which messages are written includes an area permitting to decide that in case there is an answering machine and/or a call transfer, the message can be transmitted anyway.

Conveniently, the user can send and/or receive the communication anywhere and to any telephone number.

Conveniently, this system allows the user to have acknowledge of the receiving message by e-mail or a message on the phone.

Conveniently, this system permits to monitor every call made by the user, and the relative results are filed, so that the user can later verify and check the history of the message.

Conveniently, the user has a password in order to send and/or receive the communication and is authorized to send and/or receive the communication as the server automatically detects it.

Conveniently, the user is authorized by an identification system to use the database and the functions of the system found on the web server and, thanks to the program installed on the server, can import data onto his hardware, input them on the server database, make operations in order to send messages to several addressees, select pre-recorded messages, select options, times and dates, file and save data on the server.

Conveniently, the data transmission for the outbound calls is not performed via cable, but through an analogue or digital telephone line.

Conveniently, this system permits to send and/or receive communications in real time and/or pre-recorded messages filed on the server in such a form suitable to be received by the addressee.

With regards to the reception, the addressee of the message can interact through telephone, using the keyboard or answering the message by voice. The server registers the answers and/or interactions left by the addressee, so that the sender, by means of a specific interface, can connect to the server, decode the meaning of the DTMF tones and/or listen to the vocal messages left by the addressee.

Conveniently, writing a text inside a banner and/or form, the user can send and/or receive a pre-recorded communication with the initial and/or final addition of the written text converted into speech.

Conveniently, an acoustic signal is transmitted as soon as there is a telephone connection with the addressee, avoiding any possible immediate disconnection in case of a brief waiting before the transmission of the communication.

Conveniently, if the transmitting file is too wide, it is automatically converted and reduced to such an extent that the addressee can correctly receive it.

Method to convert text messages into vocal messages and send them by telephone line, characterized in that it comprises the following steps:
  decoding of the text received by the user;
  conversion of the text into speech;
  extension of the size of the vocal file created;
  adjustment of the vocal message in such a form that can be read by the data transmitting card;
  interaction with the transmitting card;
  dialing of the number(s) indicated;
  transmission of the message on the phone;
  recording of the data of the telephone call, filing of the data on a server database;
  previous method that, during conversion, compress the file if wider and not suitable for a perfect transmission.

This method creates more audio files that are arranged by number and sent, following the order of configuration, all together in the same telephone call, so allowing the addressee to listen on the phone to several vocal messages arranged in order but included in a single call.

Conveniently, the first stage of conversion of the words is called "standardization of the text", the second stage is the "standardization of the pronunciation", the third stage is the pronunciation itself that put in order more phonemes. Specific algorithms are used in order to fragment words and find the sound produced by a specific letter. The last stage of this process is the "prosody", which is the speed of reading, with possible pauses and other details for the perfection of the audio. At this stage, the voice modem and/or a technological platform make the text completely voice.

The text written by a user, by an IP connection, gets to a server, where it's converted into speech and sent to a telephone number by a telephone line. The entire executing process is then saved on a file that can be always read by means of an IP connection.

This system involves hardware, data transmission systems, telephone lines, specialized software, receiving apparatus and many technical details.

Figure 1:
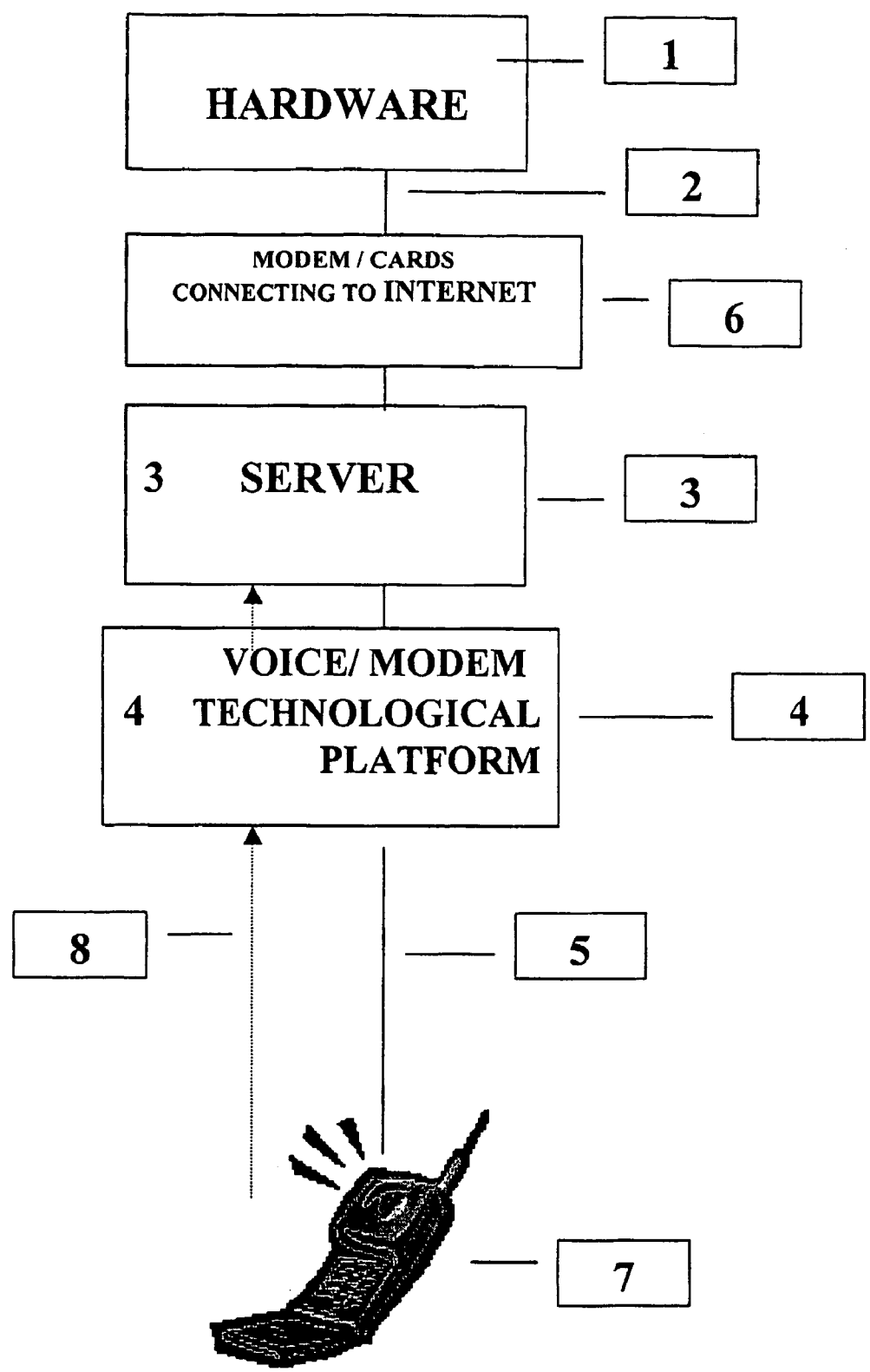
FIG. 1—The flowchart of FIG. 1 shows that this system, in order to work, needs: a hardware (1), used by the user for writing messages and sending them; a connection to Internet (2), by modem (6) or ISDN connecting card, net card or alternative systems connecting to Internet; a server (3) where a software is installed, directing the various functions and changes text messages into speech, sending them by means of voice modem and/or technological platforms for transmitting vocal data (4) by a telephone line (5), until they reach the telephone (7) of the addressee of the communication. The addressee, if he wishes, can interact with the vocal message received using the keyboard or answering by voice. This possible interaction will be sent (8) on the server and filed for the sender who can then read and/or listen it.
Figure 2:
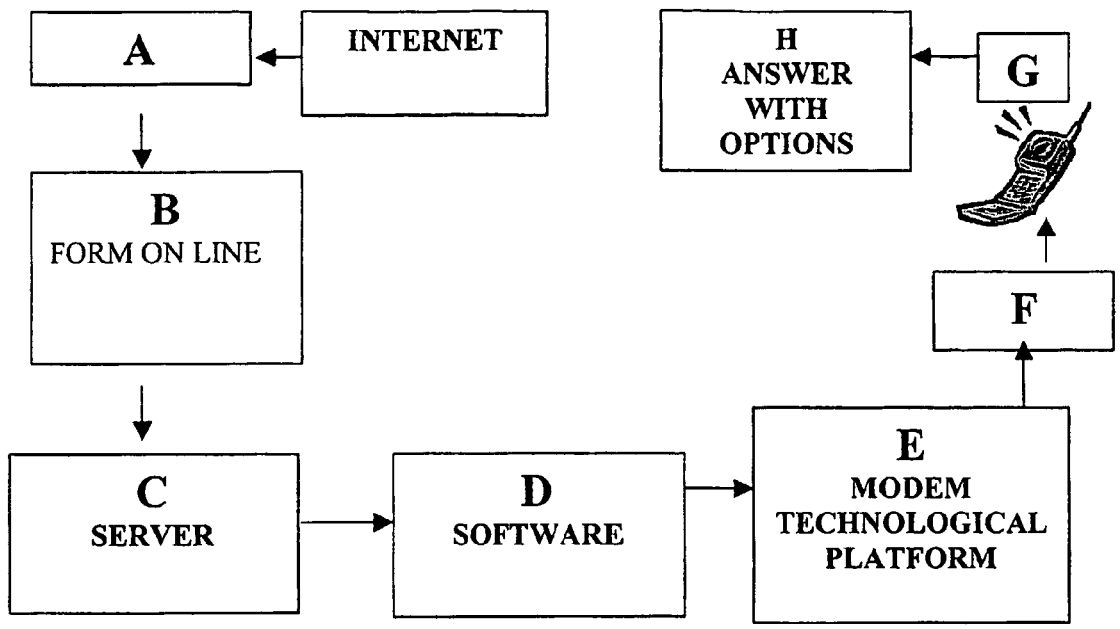

FIG. 2—This flowchart shows the steps of the system in the case the user uses a form found on Internet.

On a web page the user can find a form to write a text. This form may contain several details. The user writes a message (B) and presses enter to send it to the server (C). The server files the message, encodes it thanks to a software (D), using a "voice engine", and changes it into speech thanks to the TTS technology. The telephone number of the addressee is received by the software that is configured to send the communication by means of a voice modem and/or a technological platform (E). The peripheral sends the message to the addressee by a normal telephone line (F). So, the addressee receives the communication, which was originally sent in the form of text and then converted into speech. In addition, the addressee (G) can interact with the caller, using the keyboard, by the DTMF system or directly with the microphone of the telephone. So doing, he can answer questions and/or send communications that will be saved in log files available for data analysis and decoding.

Figure 3:
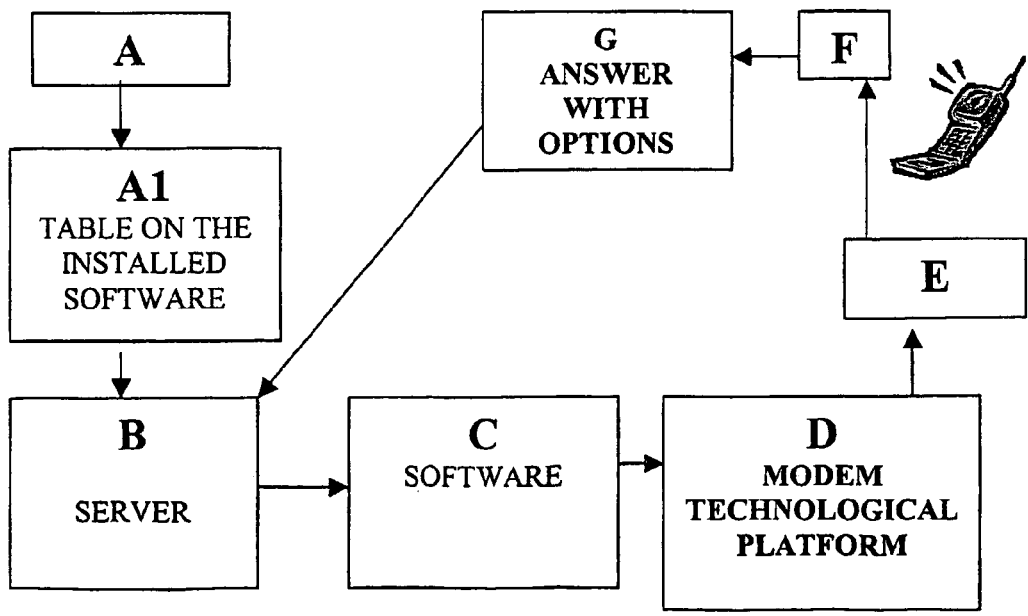

FIG. 3—This flowchart briefly shows the action of the Internet user in the case he has downloaded a software to run the system. The surfer (A) writes the message (A1) directly on the table of the software installed on his/her hardware, without using a form on-line as in the previous case. The communication starts and gets to the web server (B) that records it, while the software (C) changes it into speech and, by means of a voice modem (D) and/or other data transmitting/receiving cards, sends it to the designated number by a telephone line (E). The communication reaches the addressee's telephone (F). The addressee has the possibility of answering with various options (G). For this system, the surfer must use a software specifically provided, connects to Internet, writes a message by the software interface, sends it to a web server, which converts it into speech, by means of sophisticated software, and sends it to the addressee. By means of the software, the user can also send pre-recorded communications filed on the server.

FIGS. 4A, 4B, 4C, 4D—These figures schematically show how the user can write a message and send it. In particular, they describe some practical solutions of this invention. In these examples, it's possible to send and/or receive the communication to an alias as well as to a telephone number and/or in the desired language. In particular: FIG. 4A shows the system used for social utility or emergency cases; FIG. 4B shows the system used looking for a job; FIG. 4C shows the system used looking for new friends; FIG. 4D shows the system for everyday use. These graphic examples are simply practical solutions of the invention but are not to be considered restrictive.

Figure 5:
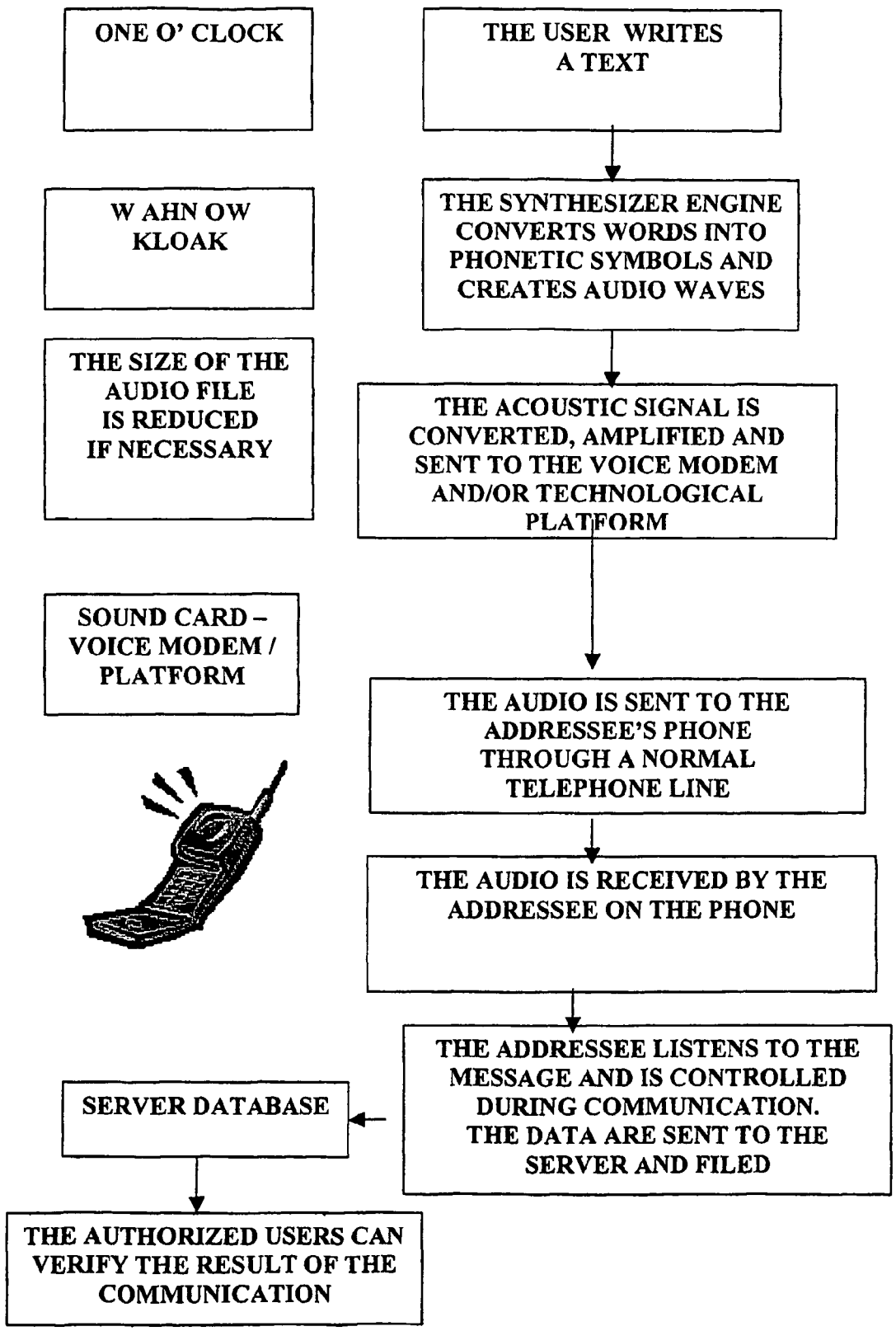

FIG. 5—This flowchart describes the system object of the invention, showing how the text-to-speech technology works in this case. Using this TTS technology, words and text are fragmented into phonemes, analysed by characters, figures, sums, inflections and punctuation. The final result is an audio form.

The invention claimed is:

1. A system for sending text messages converted into speech on a telephone by a data input device, connected with a server, said system comprising:
    a data input device being adapted to connect to the internet, said data input device having a hardware showing a table where users can write a text message and/or order the transmission of a pre-recorded message, indicate the telephone number (s) of the addressee or a database where addressees' telephone numbers can be found, and send it to another hardware working as server; and
    a server adapted to connect to the internet and to receive and transmit data to and from said data input device, wherein said server being adapted to process said text message via a program installed on said serve which is able to convert said text message into a vocal message and set it up for transmission on a telephone system, said server being adapted to create said table comprising: an area to write at least one message; an area for inputting a sender's telephone number; an area for inputting at least one addressee's telephone number to which said vocal message will be sent to;
    an area for inputting the language to be used to send said vocal message to said addressee's telephone number; and an area for selecting of a pre-recorded message loaded on said server.

2. The system according to claim 1, characterized in that the messages are sent, no matter the length of the text, in real time to another hardware working as server where a program is installed able to convert the text message into vocal message, compressed if wider, set it up for the transmission on the phone and received on a common phone anywhere, no matter the country of destination.

3. The system according to claims 1 and 2, characterized in that it's possible to reply to the vocal messages received, by means of a suitable keyboard connected to the phone using dtmf keys and tones, so that that the message is then filed on the server.

4. The system according to claim 1, wherein said table further comprising an area for inserting the time and data to send said vocal message; an area for selecting the tone of voice of said vocal message; an area for selecting an automatic repeat of said telephone: and an area permitting to decide that in case there is an answering machine and/or a call transfer, said vocal message can be transmitted anyway.

5. The system according to claim 1, characterized in that it allows the user to have acknowledge of the receiving message by e-mail or a message on the phone.

6. The system according to claim 1, characterized in that it permits to monitor every call made by the user, and the relative results are filed, so that the user can later verify and check the history of the message.

7. The system according to claim 1, characterized in that the data transmission for the outbound calls is performed via an analogue or digital telephone line.

8. A method to convert text messages into vocal messages and send them by telephone line, characterized in that it comprises the following steps:
    providing a system comprising: a data input device having a means to connect said data input device to the internet and send text, and a hardware to display a table: and a server connected to the internet and adapted to receive and transmit text to and from said data input device, process text into vocal messages and vocal messages into text, and receive and transmit vocal messages to at least one telephone number, said server having software which creates said table displayed on said hardware of said data input device;

creating said table using software on said server and transmitting said table to said data input device;

displaying said table on said data input device, wherein said table having an area to write at least one text message, an area for inrutting a sender's telephone number, an area for inputting at least one addressee's telephone number; an area for inputting the language to be used to send said vocal message, an area for selecting of a pre-recorded message loaded on said server, an area for inserting the time and data to send said vocal message, an area for selecting the tone of voice of said vocal message, an area for selecting an automatic repeat of said telephone, and an area permitting to decide that in case there is an answering machine and/or a call transfer, said vocal message can be transmitted anyway;

entering, using said data input device, at least said text message in said text message area, and said addressee's telephone number in said addressee's telephone number area in said table;

transmitting said text message from said data input device to said server through the internet;

decoding of said text message by said server; conversion of said text message into speech by said server using a text-to-speech means whereby words and text from said text message are fragmented into phonemes, analyzed by characters, figures, sums, inflections and punctuation to create a vocal file;

extension of the size of the vocal file created;

adjustment of the vocal message in such a form that can be read by a data transmitting card in said server;

interaction with the transmitting card;

dialing of the number(s) indicated said addressee's telephone number entered in said addressee's telephone number area of said table;

transmitting of said vocal file to a telephone associated with said addressee's telephone number;

determining if a telephone connection between said server and said addressee's telephone is made;

transmitting said vocal file from said server to said addressee's telephone when said telephone connection is determined;

transmitting an acknowledgment message to said data input device;

recording of data of the telephone call; and filing of the data on a server database.

9. The method according to claim 8, characterized in that, during saving, it compresses the file if wider and not suitable for a perfect transmission.

10. A message sending and receiving system comprising:

a data input device having a means to connect said data input device to the internet and send text data, and a hardware to display a table;

a server connected to the internet and adapted to receive and transmit text data to and from said data input device, process text data into vocal messages and vocal messages into text data, and receive and transmit vocal messages to at least one telephone number, said server having software which creates said table displayed on said hardware of said data input device, said table comprising: an interface used to write at least one message and send it to said server; an area for inputting a sender's telephone number; an area for inputting at least one addressee's telephone number to which said vocal message will be sent to; an area for inputting the language to be used to send said vocal message to said addressee's telephone number; an area for selecting of a pre-recorded message loaded on said server; an area for inserting the time and data to send said vocal message; an area for selecting the tone of voice of said vocal message; an area for selecting an automatic repeat of said telephone; and an area permitting to decide that in case there is an answering machine and/or a call transfer, said vocal message can be transmitted anyway; and a telephone associated with said telephone number and having a keyboard connectable to said telephone using DTMF keys and tones; said telephone being adapted to send a reply message to said data input device via said server, wherein said server is adapted to send acknowledgment of the receiving of said vocal message or said text data, to monitor every call made by a user and the relative results are filed so that the user can later verify and check the history of said text data and vocal message, and to transmit said vocal message when a telephone connection with said addressee's telephone is determined to avoid any possible immediate disconnection in case of a brief waiting before the transmission of the communication.

11. The message sending and receiving system according to claim 10, wherein said server transmits said vocal message to said addressee's telephone through an outbound telephone call via an analogue or digital telephone line.

12. The message sending and receiving system according to claim 11, wherein said server requires a password in order to send and/or receive said text data and to send and/or receive said vocal message.

13. The message sending and receiving system according to claim 12, wherein said acknowledgment is an e-mail.

14. The message sending and receiving system according to claim 12, wherein said acknowledgment is a phone message.

15. The message sending and receiving system according to claim 10, wherein said server uses a text-to-speech means whereby words and text from said text date are fragmented into phonemes, analyzed by characters, figures, sums, inflections and punctuation to create said vocal message.

16. The message sending and receiving system according to claim 10, wherein said area for inputting a sender's telephone number on said table is an area for inputting an "alias" or nickname associated with said sender's telephone number, and said area for inputting at least one addressee's telephone number is an area for inputting an "alias" or nickname associated with said addressee's telephone number.

* * * * *

UNITED STATES PATENT AND TRADEMARK OFFICE
CERTIFICATE OF CORRECTION

| | | |
|---|---|---|
| PATENT NO. | : 7,310,329 B2 | |
| APPLICATION NO. | : 10/491797 | |
| DATED | : December 18, 2007 | |
| INVENTOR(S) | : Riccardo Vieri et al. | |

It is certified that error appears in the above-identified patent and that said Letters Patent is hereby corrected as shown below:

In column 1, line 6, above "TECHNICAL FIELD" insert -- DESCRIPTION --.

In column 8, line 15, in Claim 1, delete "number (s)" and insert -- number(s) --, therefor.

In column 8, lines 19-33, in Claim 1, delete "a server adapted to connect to the internet and to receive and transmit data to and from said data input device, wherein said server being adapted to process said text message via a program installed on said serve which is able to convert said text message into a vocal message and set it up for transmission on a telephone system, said server being adapted to create said table comprising: an area to write at least one message; an area for inputting a sender's telephone number; an area for inputting at least one addressee's telephone number to which said vocal message will be sent to; an area for inputting the language to be used to send said vocal message to said addressee's telephone number; and an area for selecting of a pre-recorded message loaded on said server."
and insert -- a server adapted to connect to the internet and to receive and transmit data to and from said data input device, wherein said server being adapted to process said text message via a program installed on said server which is able to convert said text message into a vocal message and set it up for transmission on a telephone system, said server being adapted to create said table comprising: an area to write at least one message; an area for inputting a sender's telephone number; an area for inputting at least one addressee's telephone number to which said vocal message will be sent to; an area for inputting the language to be used to send said vocal message to said addressee's telephone number; and an area for selecting of a pre-recorded message loaded on said server. --, therefor.

In column 8, line 44, in Claim 3, after "that" delete "that".

In column 8, line 50, in Claim 4, delete "telephone:" and insert -- telephone; --, therefor.

In column 9, line 1, in Claim 8, delete "table:" and insert -- table; --, therefor.

Signed and Sealed this
Twenty-ninth Day of November, 2011

David J. Kappos
*Director of the United States Patent and Trademark Office*

CERTIFICATE OF CORRECTION (continued)
U.S. Pat. No. 7,310,329 B2

In column 9, line 13, in Claim 8, delete "inrutting" and insert -- inputting --, therefor.

In column 9, lines in Claim 8, delete "decoding of said text message by said server; conversion of said text message into speech by said server using a text-to-speech means whereby words and text from said text message are fragmented into phonemes, analyzed by characters, figures, sums, inflections and punctuation to create a vocal file;" and
insert -- decoding of said text message by said server;
conversion of said text message into speech by said server using a text-to-speech means whereby words and text from said text message are fragmented into phonemes, analyzed by characters, figures, sums, inflections and punctuation to create a vocal file; --, therefor.

In column 9, line 41, in Claim 8, after "dialing of" delete "the number(s) indicated".